(12) United States Patent
Kreutzkaemper et al.

(10) Patent No.: US 10,590,921 B2
(45) Date of Patent: Mar. 17, 2020

(54) LUBRICANT PUMP

(71) Applicant: SKF Lubrication Systems Germany GmbH, Walldorf (DE)

(72) Inventors: Juergen Kreutzkaemper, Waibstadt-Daisbach (DE); Jan Ruiter, Schwetzingen (DE); Andreas Schoenfeld, Sankt Leon-Rot (DE)

(73) Assignee: SKF Lubrication Systems Germany GmbH, Walldorf (DE)

( * ) Notice: Subject to any disclaimer, the term of this patent is extended or adjusted under 35 U.S.C. 154(b) by 231 days.

(21) Appl. No.: 15/135,179

(22) Filed: Apr. 21, 2016

(65) Prior Publication Data

US 2016/0312777 A1 Oct. 27, 2016

(30) Foreign Application Priority Data

Apr. 23, 2015 (DE) .......................... 10 2015 207 468

(51) Int. Cl.
| | |
|---|---|
| *F04B 17/03* | (2006.01) |
| *F04B 23/02* | (2006.01) |
| *F16N 11/10* | (2006.01) |
| *F01M 1/02* | (2006.01) |
| *F16N 13/06* | (2006.01) |

(52) U.S. Cl.
CPC ............ *F04B 17/03* (2013.01); *F04B 23/025* (2013.01); *F04B 23/026* (2013.01); *F16N 11/10* (2013.01); *F01M 2001/023* (2013.01); *F01M 2001/0253* (2013.01); *F16N 2013/063* (2013.01)

(58) Field of Classification Search
CPC ...... F04B 23/02; F04B 23/021; F04B 23/025; F04B 23/023; F04B 23/026; F16N 13/02; F16N 2013/063; F01M 2001/023; F01M 2001/0253

USPC .................................. 417/423.3, 430, 424.1
See application file for complete search history.

(56) References Cited

U.S. PATENT DOCUMENTS

| | | | | |
|---|---|---|---|---|
| 2,361,747 | A | * 10/1944 | Curtis .................. | F02M 37/103 222/385 |
| 2,480,435 | A | * 8/1949 | Aspelin ................ | F02M 37/103 222/333 |
| 5,542,823 | A | * 8/1996 | de Jong ................ | F04B 17/03 417/273 |

FOREIGN PATENT DOCUMENTS

| | | | |
|---|---|---|---|
| CN | 102341636 | 2/2012 | |
| DE | 19955865 A1 * | 11/2000 | ............. F16N 25/02 |
| DE | 19955865 | 7/2005 | |
| DE | 202005012870 U1 | 12/2005 | |
| DE | 102004061447 A1 | 6/2006 | |
| DE | 102009022707 A1 | 9/2010 | |
| DE | 112011103953 | 7/2012 | |
| EP | 0297735 | 1/1989 | |
| EP | 0297735 A1 | 1/1989 | |

* cited by examiner

*Primary Examiner* — Philip E Stimpert
(74) *Attorney, Agent, or Firm* — 2SPL Patent Attorneys PartG mbB; Kieran O'Leary

(57) ABSTRACT

Disclosed is a lubricant supply device, including at least
   a first housing section forming a reservoir for a lubricant,
   a second housing section including a feed pump for feeding the lubricant from the reservoir to a lubricant outlet and
   a motor driving at least the feed pump,
the motor being arranged in the first housing section forming the reservoir.

11 Claims, 1 Drawing Sheet

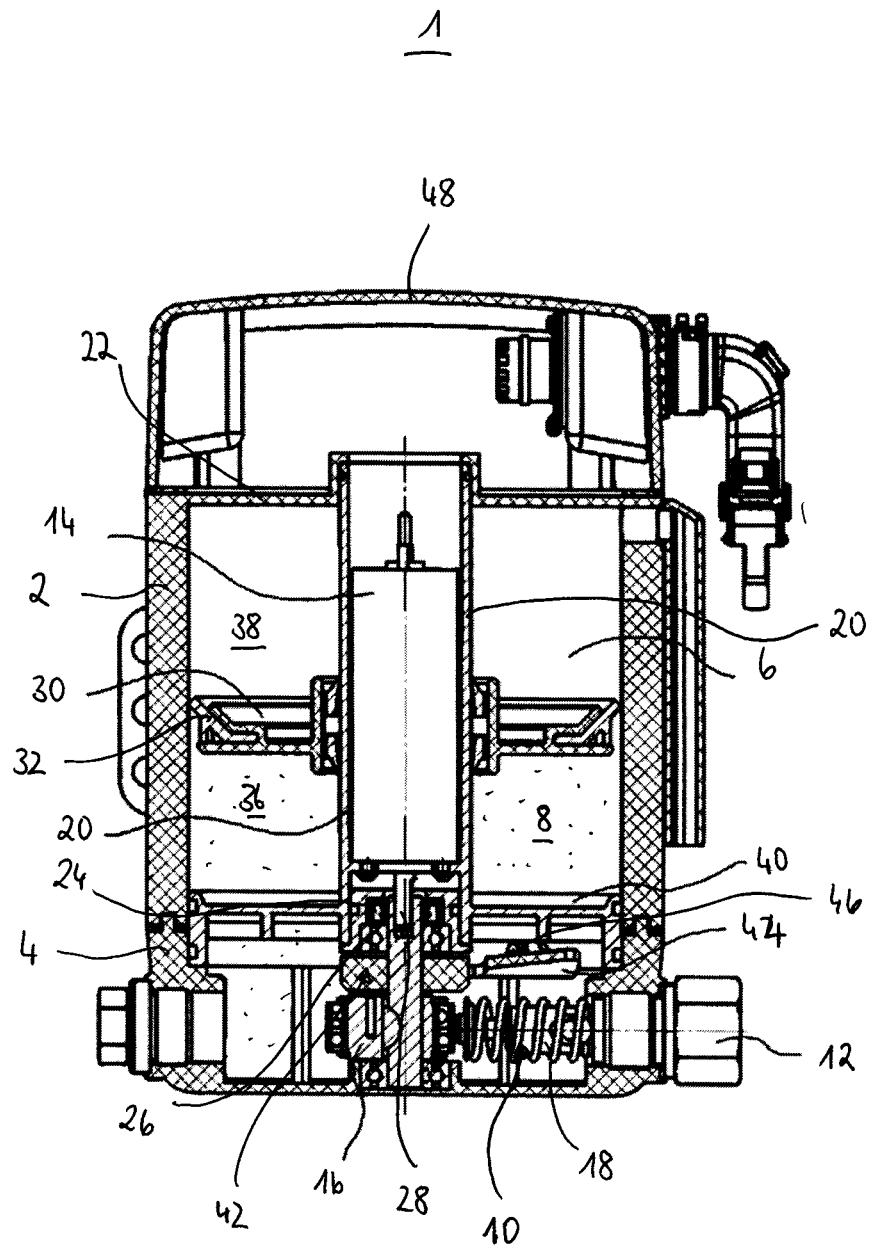

LUBRICANT PUMP

The present invention relates to a lubricant supply device according to the subject matter of patent claim 1.

A corresponding lubricant pump is, for example, described in DE 199 55 865. This reference illustrates a lubricant supply having a first housing section configured as a reservoir and a second housing section arranged below the same comprising a feed pump. In order to move lubricant from the reservoir in the direction of the feed pump, further a follower piston is provided which presses the lubricant contained within the reservoir in the direction of the feed pump. Further, the reference discloses that additionally a blade wheel may be provided which moves the lubricant pressed down by the follower piston in the direction of the feed pump. In order to move the blade wheel and the feed pump, further an electric motor is provided arranged in a third housing section arranged below the second housing section.

It is a disadvantage with such lubricant pumps, however, that the many housing sections require lots of available space.

It is thus the object of the present invention to provide a lubricant supply device which is configured to be more compact and which requires less available space.

This object is solved by a lubricant supply device according to patent claim 1.

In the following, a lubricant supply device comprising at least a first housing section forming a reservoir for a lubricant and a second housing section including a feed pump for feeding the lubricant from the reservoir to a lubricant outlet is disclosed. Further, the lubricant supply device comprises a motor, in particular an electric motor, which is implemented to drive at least the feed pump.

In order provide an implementation of the lubricant pump which is as compact as possible it is proposed according to the invention to arrange the motor directly in the housing section forming the reservoir. Consequently the third housing section known from the prior art is omitted, so that the lubricant supply device is all in all built clearly more compact and requires less available space.

Here, the motor may advantageously be arranged in a tube-shaped, preferably cylindrical interior housing which extends from the feed pump to a lid side of the first housing section forming the reservoir and facing away from the feed pump and which preferably forms a substantially lubricant-free space. By this interior housing, a lubricant-free space may be created which is in particular suitable for receiving a motor.

According to a further advantageous embodiment, the motor is in heat exchanging contact with the lubricant and/or the tube-shaped interior housing. Consequently, in particular with cold temperatures, on the one hand the motor may be protected from cold by the lubricant arranged within the reservoir and thus surrounding the motor and on the other hand the motor may heat the lubricant surrounding the same by waste heat generated by the same and thus also provide for a sufficient viscosity of the lubricant also at low temperatures.

According to a further advantageous embodiment, the motor is arranged centrically within the first housing section. It is preferable that the motor or the interior housing receiving the same extends along a central axis of the first housing section. Due to this centrical arrangement, the thermal interaction between motor and lubricant may be maximized.

According to a further advantageous embodiment, in the first housing section further a follower plate, in particular a follower piston, is arranged which is axially shiftable between the feed pump and a lid side of the first housing section facing away from the pump. By means of this follower plate lubricant may be pressed out of the reservoir in the direction of the feed pump. It is in particular advantageous here when the axially shiftable follower plate is guided by the motor and/or by the tube-shaped interior housing. In this case, a centrical arrangement of the motor and/or the interior housing is in particular advantageous, as a pressure which then acts upon a face of the follower plate is equally distributed. A tilting due to non-uniform pressure of the lubricant onto one side of the follower plate may thus be prevented.

On the edge side, the follower plate is preferably provided with a seal which removes the lubricant from an interior side of the first housing section so that the follower plate separates a space supplied with lubricant from a lubricant-free space.

Further, the follower plate may be configured in such a way that is pressurized, in particular under spring pressure. In this respect, preferably a spring is arranged between the follower plate and the lid side of the reservoir which is on the one side supported by the lid side and on the other side by the follower plate. Due to this pressurization lubricant may actively be pressed in the direction of the feed pump which is necessary and advantageous in particular with lubricating grease. A follower plate would likewise be possible which follows the level of the lubricant merely based on gravitation.

According to a further advantageous embodiment, the lubricant supply device comprises a stirring apparatus by means of which lubricant may be circulated and transported in the direction of the supply pump. In this respect, the stirring apparatus is preferably arranged in a bottom area, in particular in the second housing section. This way, lubricant in the area of the supply pump may be directly fed to the feed pump on the one hand and on the other hand basically be free from air so that a damaging of the feed pump due to cavitation may be prevented.

It is further advantageous when the stirring apparatus is also driven by the motor. This may, for example, be the case when an eccentric existing at the motor and operating a piston of the feed pump is non-rotatably connected to the stirring apparatus so that stirring apparatus and eccentric are rotated together. This way, a further motor may be omitted, so that no additional space is required.

According to a further advantageous embodiment, between the first and the second housing section an intermediate floor is arranged. This intermediate floor preferably comprises openings through which lubricant may be fed from the first housing section into the second housing section. Here, preferably the stirring apparatus is arranged below the intermediate floor. It may thus be guaranteed that the stirring apparatus and the follower piston are spatially separated from each other.

Here, according to a further advantageous embodiment, between intermediate floor and stirring apparatus at least one rolling element is provided, in particular at least one roll which supports the stirring apparatus on the intermediate floor. These rolling elements or rolls reduce the resistance of the stirring apparatus when rotating and offer an axial support of the stirring apparatus in the upward direction. This is advantageous as conventionally the stirring apparatus comprises tilted stirring blades which press lubricant downward in the direction of the feed pump. If this lubricant shows a high resistance, for example when it is very cold, this axial support prevents the stirring blades from evading upwards and thus improves the transport of the lubricant in the direction of the feed pump.

As illustrated by a further preferred embodiment, the stirring apparatus may here partially be manufactured from plastics. This again reduces the weight of the lubricant supply device.

According to a further advantageous embodiment, further a third housing section is provided which is arranged on the side of the first housing section facing away from the feed pump and which is configured as a receptacle for at least one electronic assembly for controlling the feed pump and/or the motor. Here, in the third housing section the complete electronics may be received so that an electrical room to be formed especially in the vicinity of the feed pump may be omitted. The cables required for controlling the feed pump may in the above described advantageous implementations of the lubricant supply device simply be guided along the motor in the direction of the feed pump. This way, the lubricant supply device may be manufactured particularly simple as a complicated sealing for forming a lubricant-free space in the vicinity of the feed pump may be omitted.

Further advantages and advantageous implementations are defined in the sub-claims, the description and the drawings.

In the following, the invention is to be described in more detail with reference to an embodiment illustrated in the drawing. Here, the embodiment is merely exemplary and is not intended to define the scope of the application. The same is defined by the appended claims only.

What is shown is:

FIG. 1: a schematic sectional view through a preferred embodiment of a lubricant supply device.

In the following, like, or seemingly like elements are designated by the same reference numerals.

FIG. 1 shows a schematic sectional view through a lubricant supply device 1 comprising a first housing section 2 and a second housing section 4. Here, the first housing section 2 is implemented as a reservoir 6 for lubricant 8, while the second housing section 4 includes a feed pump 10 by means of which lubricant 8 is fed from the reservoir 6 in the direction of a lubricant outlet 12.

This supply pump 10 is as usual driven by a motor 14, in particular an electric motor which, as is conventionally known, rotates an eccentric 16 which in turn moves supply piston 18 of the supply pump 10.

In order to provide a lubricant supply device 1 which is especially space-saving, the motor 14 is further arranged in the first housing section 2 forming the reservoir 6. In this respect, in the housing section 2 an interior housing 20 may be provided which receives the motor 14 and extends from a lid side 22 of the housing section 2 to the eccentric 16. Consequently, the interior housing 20 forms a substantially lubricant-free space. On the side facing the eccentric 16 the housing 20 is sealed tight by means of sealing elements 24 at which simultaneously bearings 26 are arranged which care for a transmission of the rotary movement of an axis of rotation 28 of a motor 14 to the eccentric 16.

Further, FIG. 1 shows that in the first housing section 2 a follower piston 30 is arranged which is axially guided by the interior housing 20. Follower piston 30 is basically supported by the lubricant 8 and comprises a ring seal 32 or other sealing elements at its circumferential edges which separate a space 36 supplied with lubricant 8 from an airspace 38.

Further, FIG. 1 shows that between the first housing section 2 and the second housing section 4 an intermediate floor 40 is arranged which comprises one or several openings through which lubricant may be guided from the space 36 in the direction of the feed piston 10 and into the second housing section 4. Below the intermediate floor 40 further a stirring apparatus 42 is arranged which is connected non-rotational to the eccentric 16 and is driven by the motor 14. This stirring apparatus 42 further comprises at least one stirring blade 44 which is implemented in the form of a blade wheel and presses lubricant from the first housing section 2 into the second housing section 4 and from there in the direction of the feed pump 10. Simultaneously, the stirring blade 44 circulates the lubricant in the housing section 4 so that possibly existing air inclusions in the lubricant are removed. This way, damages caused by cavitations in the pump 10 may be prevented.

Further, FIG. 1 shows that between the intermediate floor 40 and the stirring blade 44 at least one rolling element in the form of a roll 46 is arranged which axially supports the stirring blade 44 against the intermediate floor 40. This way, a higher stability of the stirring blade 44 may be acquired. This is in particular advantageous with cold temperatures or cold lubricant as then the movement of the stirring blade 44 may be supported in the direction of the first housing section 2. This movement basically results from the inclination of the stirring blades 44 and the transport of the lubricant in the direction of the feed pump.

Apart from the space-saving arrangement of the motor 14 in the reservoir 6, the arrangement has the further advantage that the motor 14 is in heat-exchanging contact with the interior housing 20 and thus with the lubricant 8. In this way, on the one hand the waste heat of the motor 14 may care for heating up the lubricant 8 and simultaneously the lubricant 8 insulates the motor 14 from excessive temperature fluctuations. This way, in particular with cold temperatures, the motor 14 is better protected. Apart from that, the viscosity of the lubricant 8 may be kept in an optimum temperature range also at low temperatures.

Above the lid area 22 further a housing section 48 may be arranged which includes an electrical controller (not illustrated) for the motor 14 and the piston pump 10. The lines and cables required for the same may be guided within interior housing 20 in the direction of the feed pump 10 and/or the motor 14. Due to the formation of an electrical room above the lubricant a particularly simple lubricant-free zone for receiving the required electronics assemblies may be provided.

All in all, the arrangement of the motor 14 within the first housing section 2 illustrated here may provide a very compact lubricant supply device 1. Apart from that, the motor 14 positioned in the reservoir 6 is protected from external influences like temperature fluctuations by the lubricant 8 enclosing the same. Simultaneously, the waste heat of the motor 14 in operation may be passed on to the surrounding lubricant 8, whereby the feeding characteristics of critical lubricants 8 at low temperatures is influenced positively. Apart from that, the positioning of the stirring blade 44 below the intermediate floor 20 has the advantage that air inclusions, in particular during initial filling, are equally distributed in the ongoing operation of the pump 10 so that the pump 10 is protected from cavitation damages.

REFERENCE NUMERALS LIST 1 lubricant supply device
2 first housing section
4 second housing section
6 reservoir
8 lubricant 10 feed pump
12 lubricant outlet
14 motor
16 eccentric
18 feed piston
20 interior housing
22 lid side
24 seal
26 bearing
28 rotational axis
30 follower piston
32 ring seal
36 lubricant receptacle
38 airspace
40 intermediate floor
42 stirring apparatus
44 stirring blade
46 roll
48 control housing

The invention claimed is:

1. Lubricant supply device, comprising:
a first housing section forming a reservoir for a lubricant, wherein the first housing section further comprises a follower plate which is axially shiftable between the feed pump and a lid side of the first housing section facing away from the feed pump;
a second housing section axially adjacent to the first housing section comprising a stirrer and a feed pump, wherein the feed pump is configured to feed the lubricant from the reservoir to a lubricant outlet, and wherein the stirrer is configured to circulate and transport the lubricant in the direction of the feed pump; and
a motor driving at least the feed pump, the motor being contained within the first housing section and located entirely within an axial extent of the first housing section.

2. Lubricant supply device according to claim 1, wherein the motor is arranged in a tube-shaped cylindrical interior housing, wherein the interior housing extends from the feed pump to the lid side of the first housing section.

3. Lubricant supply device according to claim 1, wherein the motor is in heat-exchanging contact with the lubricant and/or the interior housing.

4. Lubricant supply device according to claim 1, wherein the motor is arranged centrically in the first housing section forming the reservoir, wherein the motor and/or the interior housing extend in the direction of a central axis of the first housing section forming the reservoir.

5. Lubricant supply device according to claim 1, wherein the axially shiftable follower plate is guided by an interior housing.

6. Lubricant supply device according to claim 1, wherein the follower plate is pressurized.

7. Lubricant supply device according to claim 1, wherein the stirrer is driven by the motor.

8. Lubricant supply device according to claim 1, wherein the first and the second housing section are separated from each other by a lubricant-permeable intermediate floor.

9. Lubricant supply device according to claim 8, further comprising at least one roller element located between the intermediate floor and the stirrer, supporting the stirrer at the intermediate floor.

10. Lubricant supply device according to claim 1, wherein the lubricant supply device further comprises a third housing section which is arranged on the side of the first housing section facing away from the feed pump.

11. Lubricant supply device, comprising:
a first housing section forming a reservoir for a lubricant,
a second housing section comprising a stirrer and a feed pump, wherein the feed pump is configured to feed the lubricant from the reservoir to a lubricant outlet, and wherein the stirrer is configured to circulate and transport the lubricant in the direction of the feed pump; and
a motor driving at least the feed pump, the motor being contained within the first housing section,
wherein the first and the second housing section are separated from each other by a lubricant-permeable intermediate floor and at least one roller element is located between the intermediate floor and the stirrer, supporting the stirrer at the intermediate floor.

* * * * *